US006857639B2

(12) United States Patent
Beeck et al.

(10) Patent No.: US 6,857,639 B2
(45) Date of Patent: Feb. 22, 2005

(54) GAP SEAL FOR SEALING A GAP BETWEEN TWO ADJACENT COMPONENTS

(75) Inventors: Alexander Beeck, Orlando, FL (US); Arkadi Fokine, Moscow (RU); Edouard Sloutski, Moscow (RU); Sergey Vorontsov, Moscow (RU)

(73) Assignee: ALSTOM Technology LTD, Baden (CH)

( * ) Notice: Subject to any disclaimer, the term of this patent is extended or adjusted under 35 U.S.C. 154(b) by 33 days.

(21) Appl. No.: 10/611,941

(22) Filed: Jul. 3, 2003

(65) Prior Publication Data
US 2004/0041350 A1 Mar. 4, 2004

(30) Foreign Application Priority Data
Jul. 3, 2002 (RU) ........................................ 2002117875

(51) Int. Cl.[7] ................................................ F16J 15/02
(52) U.S. Cl. ........................ 277/637; 277/644; 277/647
(58) Field of Search ................................. 277/611, 626, 277/637, 641, 644, 647; 52/395, 396.04; 415/134–139

(56) References Cited

U.S. PATENT DOCUMENTS

| 3,279,805 | A | * | 10/1966 | Quinson ...................... 277/611 |
| 4,548,429 | A | * | 10/1985 | Merz ........................... 285/236 |
| 5,104,286 | A | * | 4/1992 | Donlan ..................... 415/170.1 |
| 5,228,255 | A | * | 7/1993 | Hahn ........................ 52/396.04 |
| 5,657,998 | A | * | 8/1997 | Dinc et al. .................. 277/653 |
| 6,014,849 | A | * | 1/2000 | Yonemura .................. 52/586.1 |

FOREIGN PATENT DOCUMENTS
GB 2 303 888 A 3/1997

OTHER PUBLICATIONS
Search Report from EP 03405411.4 (Apr. 8, 2004).

\* cited by examiner

*Primary Examiner*—Alison K. Pickard
(74) *Attorney, Agent, or Firm*—Cermak & Kenealy; Adam J. Cermak

(57) ABSTRACT

The invention relates to a gap seal (6) for sealing a gap (3) between two adjacent components (1, 2), in particular of turbo machines, with the following characteristics:

- each component (1) has one each groove (7) that is open towards the gap (3),
- the two grooves (7) are essentially facing each other in the gap (3),
- in each groove (7), a compensation body (16) is movably positioned transversely to the longitudinal groove direction and parallel to the gap plane (10),
- each compensation body (11) abuts the groove bottom (9) of the corresponding groove (7) in a sealing manner,
- each compensation body (11) has a V-shaped receiving groove (14) that is open towards the facing compensation body (11),
- a mutual sealing body (16) has a rhombus-shaped cross-section and projects with outer sides (17) into both receiving grooves (14),
- the straight inner sides (15) of each receiving groove (14) are angled towards each other at the same angle as the straight outer sides (17),
- in each receiving groove (14), at least one outer side (17) of the sealing body (16) abuts the corresponding inner side (15) of the receiving groove (14) with surface contact and in a sealing manner.

5 Claims, 1 Drawing Sheet

GAP SEAL FOR SEALING A GAP BETWEEN TWO ADJACENT COMPONENTS

FIELD OF TECHNOLOGY

The invention relates to a gap seal for sealing a gap between two adjacent components, in particular in turbo machines.

STATE OF THE ART

Especially in turbo machines, individual components of a compressor or turbine, such as, for example, guide vanes or rotor blades or heat shield elements, may be mounted and positioned on a housing or rotor of a turbo machine in such a way that a gap exists between adjacent components, which gap must be sealed in order to avoid leaks and pressure losses in the turbo machine. Such a gap in a turbo machine usually extends vertical to the rotor of the compressor or turbine.

When sealing such a gap, it must be taken into consideration that the two components between which the gap is formed may be able to move relative to each during the operation of the turbo machine, for example as a result of thermal expansion effects. This relative movement causes the gap geometry to change, however, making a reliable sealing of the gap more difficult.

DESCRIPTION OF THE INVENTION

The invention means to remedy this. The invention, as characterized in the claims, has the objective of disclosing an embodiment for a gap of the initially mentioned type, which also ensures a reliable seal of the gap when the components between which the gap is formed are able to move relative to each other.

According to the invention, this objective is realized with a gap seal having the characteristics of claim 1. The secondary claims have advantageous embodiments as their subject.

The invention is based on the general thought of constructing two facing grooves in the gap in the components, into which grooves one each compensation body is set in a movable manner, whereby each compensation body has a V-shaped receiving groove that is open towards the other compensation body, into which receiving groove a mutual, complementarily shaped sealing body with a diamond-or rhombus-shaped cross-section is set in a movable manner. This design has the result that on the one hand relative movements between the components that cause a change in gap width are compensated by compensating movements of the sealing body in the receiving grooves in that, depending on the gap width, the sealing body dips more or less deeply into the receiving grooves. On the other hand, it is also possible to compensate such relative movements between the components that, in the gap plane, cause an offset of the grooves located in the components relative to each other, since the compensation bodies are positioned so as to be movable relative to the components in the corresponding grooves. It is furthermore of special importance that the sealing body abuts within the receiving grooves with surface contact, which makes it possible to achieve an especially high sealing effect. The surface contact also reduces abrasive effects so that the lifespan of the gap seal according to the invention is increased. It is clear that any combinations of the described relative movements also can be compensated.

It is preferred that the sealing body and the receiving grooves have such dimensions that, as a result of the relative movements of the two components, it is also possible to realize a minimum gap width with which the components abut each other. This design ensures that the gap seal also is not damaged with extreme relative movements of the components and its sealing function is ensured.

According to an advantageous further development, the groove bottom in the two grooves in the components may be constructed level and may extend parallel to the gap plane, whereby each compensation body has a level bottom that abuts the corresponding groove with surface contact on the groove bottom. This design achieves an especially effective seal between the compensation body and the component in which the corresponding groove is constructed. At the same time, the abutment of the compensation body bottom with surface contact prevents abrasive effects on the groove bottom that may occur when the compensation body changes positions along the groove bottom.

In another further development, each groove may have a U-shaped cross-section in which facing, level inside walls of the groove extend parallel to each other and vertical to the gap plane, whereby each compensation body has a U-shaped outer cross-section in which level outside walls facing away from each other extend parallel to the corresponding inside walls of the groove, whereby a distance between the outside walls of the compensation body is smaller than a distance between the inside walls of the groove. Based on these characteristics, a relative adjustability of the compensation bodies in the corresponding groove is achieved with a simple construction. At the same time, the outside walls and inside walls parallel to each other ensure an effective stop function that prevents a canting or tipping of the compensation bodies in the groove. In the area of the stop, the sealing effect is furthermore improved by the abutment of the respective outside wall with surface contact against the corresponding inside wall. The parallelity of the walls also reduces a risk of damage to the gap seal during shock-like relative movements, for example in the case of a pressure impact.

Other important characteristics and advantages of the gap seal according to the invention are found in the secondary claims, the drawing, and related descriptions of the figures in reference to the drawing.

BRIEF DESCRIPTION OF DRAWING

The drawing shows a preferred exemplary embodiment, which is described in more detail in the following description. The only FIGURE.

WAY OF EXECUTING THE INVENTION

Figure 1:
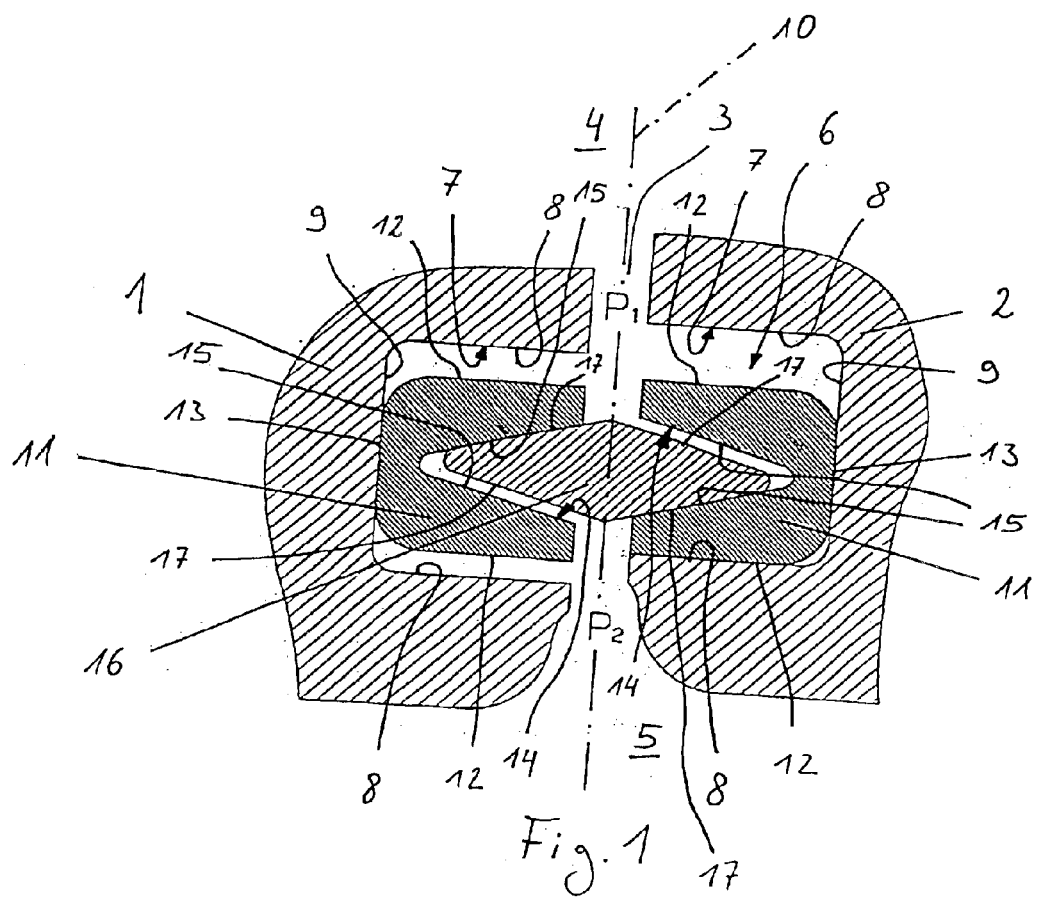
FIG. 1, shows a section of a gap seal according to the invention.

According to FIG. 1, a gap 3, by means of which the two components 1 and 2 adjoin each other, is formed between a first component 1, which may be, for example, a guide vane of a turbine, and a second component 2, which may be, for example, a heat shield element of the turbine. The gap 3 extends in a gap plane 10 that runs vertical to the drawing plane, which gap plane may be perpendicular to the rotation axis of a rotor of a turbine or of a compressor in a turbo machine. The gap 3 communicates according to FIG. 1 on the top with a first space 4 and according to FIG. 1 on the bottom with a second space 5, in which way the gap 3 creates a communicating connection between these two spaces 4 and 5. To prevent a gas exchange between the two spaces 4 and 5, the gap 3 must be sealed with the help of a gap seal 6. In particular in a turbo machine, relatively high pressure differentials may occur between spaces 4 and 5 also; for example, a pressure $P_1$ exists in the first space 4, which is substantially higher than a pressure $P_2$ in the second space 5. Accordingly, the gap seal 6 is constructed gas- and pressure-tight.

Each of components 1 and 2 has a groove 7. These grooves 7 are open towards the gap 3 and essentially face each other in the gap 3. In the preferred embodiment shown here, the grooves 7 have a U-shaped cross-section and facing, straight inside walls 8 as well as a level groove bottom 9. While the groove bottom 9 in each case extends parallel to the gap plane 10, the inside walls 8 extend parallel to each other and vertical to the gap plane 10.

In each groove 7, a compensation body 11 is positioned, which in the embodiment shown here has a U-shaped outer cross-section and two straight outside walls 12 facing away from each other as well as a bottom 13. This bottom 13 in each case faces the groove bottom 9 of the corresponding groove 7 and abuts it with surface contact and in a sealing manner. The outside walls 12 extend parallel to each other and parallel to the inside walls 8 of the corresponding groove 7. The dimensions of the grooves 7 and compensation bodies 11 set in them are chosen so that a (vertical) distance between the outside walls 12 of the compensation body 11 is smaller than a (vertical) distance between the inside walls 8 of the groove 7. As a result of these dimensions, each compensation body 11 is positioned in the corresponding groove 7 so as to be adjustable transversely to the longitudinal groove direction and parallel to the gap plane 10. With such an adjustment, the bottom 13 of the compensation body 11 slides along the groove bottom 9 of the corresponding groove 7.

On its side facing the respectively other compensation body 11, each compensation body 11 is also provided with a receiving groove 14 that has a V-shaped cross-section. This receiving groove 14 has two each straight inner sides 15 that extend at an angle to each other, forming an angle, in particular an acute angle. The receiving grooves 14 also are open towards the gap 3.

The gap seal 6 according to the invention also has a sealing body 16 that projects into both grooves 7, whereby it simultaneously also penetrates into both receiving grooves 17 of the compensation bodies 11. The sealing body 16 has a rhombus-shaped or diamond-shaped cross-section constructed complementarily to the receiving grooves 14 of the compensation bodies 11. Accordingly, the sealing body 16 has in each section that projects into one of the receiving grooves 14 two straight outer sides 17 that extend at the same angle to each other as the inside sides 15 of the respective receiving groove 14. Accordingly, the sealing body 16 in each compensation body 11 abuts the corresponding inner side 15 of the receiving groove 14 with surface contact and in a sealing manner with at least one of its outer sides 17.

The term "straight" in the current context means that the respective walls 8, 12, and sides 15, 17 are at least in the shown cross-section straight; the extension in the longitudinal groove direction then may be as desired, in particular straight or curved.

The gap seal 6 according to the invention functions as follows:

If there is a higher pressure in the first space 4 than in the second space 5, i.e. if $P_1 > P_2$, then the compensation bodies 11 are driven in the direction towards the second space 5. This results in an adjustment of the two compensation bodies 11 in the corresponding grooves 7 until at least one of the compensation bodies 11, here the compensation body 11 shown on the right, abuts the facing inside wall 8 of the corresponding groove 7 with its preceding outside wall 12 with surface contact and in a sealing manner. This creates a stop for the adjustment movement of the compensation body 11. Since walls 8 and 12 that act together to form a stop extend parallel to each other, no considerable risk of damage for the gap seal 6 exists, even in the case of shock-like contacts. By way of the pressure differential, the sealing body 16 is also driven in the direction towards the second space 5, whereby it comes to abut in its section shown in FIG. 1 with its preceding outer side 17 against the facing inner side 15 of the receiving groove 14 with surface contact and in a sealing manner. Accordingly, the other compensation body 11, i.e. the compensation body 11 shown on the left in FIG. 1, then, with its inner side 15 of the receiving groove 14 that was moved towards the sealing body 16, comes to abut with surface contact and in a sealing manner against the facing outer side 17 of the section of the sealing body 16 projecting into the receiving groove 14.

In addition, the two compensation bodies 11 are pushed away from the gap plane 10 into the grooves 7, whereupon the grooves' bottoms 13 each come to abut against the groove bottom 9 of the corresponding groove 7 with surface contact and in a sealing manner.

In the gap seal 6 according to the invention, this results in seals with surface contact action both between components 1 or 2 and the compensation bodies 11, as well as between the sealing body 16 and the compensation bodies 11. In addition, the sealing effect increases along with an increasing pressure differential because of the correspondingly increasing contact pressure.

As can be seen especially clearly from FIG. 1, the gap seal 6 according to the invention is able to compensate a change of the relative position between components 1 and 2, which may be caused, for example, by thermal expansion effects, without causing a significant change in the sealing effect. During relative movements in which the gap width, i.e. the distance between the two components 1 and 2, changes, the sealing body 16 is able to slide off along these inner sides 15 with its outer sides 17 that in a sealing manner abut the corresponding inner sides 15 of the receiving groove 17, whereby the surface contact, and therefore the sealing effect, is always preserved. It is useful that the dimensions of the grooves 7, compensation bodies 11, and sealing body 16 are selected so that a sufficient seal can be ensured in the entire range of possible gap widths. A minimal gap width may result, for example, when the two components 1 and 2 are adjusted towards each other to such an extent that they are located directly next to each other (a gap width of zero).

During relative movements between components 1 and 2 in which the components 1 and 2 adjust towards each other parallel to the gap plane 10 and transversely to the longitudinal groove direction, the compensation bodies 11, due to their positioning in the grooves 7, are able to slide relative to components 1 and 2 without causing the sealing effect to be lost. It is hereby useful that the dimensions of the grooves 7 and compensation bodies 11 as well as the positioning of the grooves 7 relative to each other are adapted to the maximum permissible adjustment range of components 1 and 2 relative to each other in order to be able to ensure a sufficient sealing effect without interruptions in the entire adjustment range.

List of Reference Numerals 1 first component
2 second component 3 gap
4 first space
5 second space
6 gap seal
7 groove
8 inside wall of 7
9 groove bottom of 7
10 gap plane
11 compensation body
12 outside wall of 11
13 bottom of 11
14 receiving groove
15 inner side of 14
16 sealing body
17 outer side of 16

What is claimed is:

1. A gap seal for sealing a gap between two adjacent components comprising:

two components having a gap therebetween defining a gap plane, each component comprising one groove that is open towards the gap, each groove having a bottom and defining a longitudinal direction, the two grooves facing each other in the gap;

a mutual sealing body projecting into both grooves, two sections of the sealing body comprising straight outer sides defining angles therebetween;

in each groove, a compensation body movably positioned transversely to the longitudinal groove direction and parallel to the gap plane;

each compensation body sealingly abutting the groove bottom of the corresponding groove;

each compensation body having a V-shaped receiving groove that is open towards the other compensation body, each V-shaped receiving groove having straight inner sides;

the sealing body having a rhombus-shaped cross-section and projecting into both receiving grooves;

the straight inner sides of each receiving groove being angled towards each other at the same angle as the straight outer sides of the section of the sealing body projecting into them; and in each receiving groove, at least one outer side of the sealing body sealingly abutting the corresponding inner side of the receiving groove with surface contact.

2. A gap seal according to claim 1, wherein the components are movable relative to each other in such a way that the gap width may change, and wherein the sealing body and the receiving grooves are dimensioned so that when a minimum gap width is realized, the components abut each other.

3. A gap seal according to claim 1, wherein the groove bottom in both grooves is level and extends parallel to the gap plane, and wherein each compensation body has a level bottom that abuts the groove bottom of the corresponding groove with surface contact.

4. A gap seal according to claim 1, wherein each groove has a U-shaped cross-section including facing, straight inside walls of the groove extending parallel to each other and vertical to the gap plane;

wherein each compensation body has a U-shaped outer cross-section including straight outside walls facing away from each other and extending parallel to corresponding inside walls of the groove;

wherein a distance between the outside walls of each compensation body is smaller than a distance between the inside walls of the corresponding groove.

5. A gap seal according to claim 1, wherein at least one of the components comprises an element of a turbine or a compressor, the element selected from the group consisting of a guide vane, a rotor blade, and a heat shield element.

* * * * *